United States Patent Office 2,728,787
Patented Dec. 27, 1955

2,728,787

PROCESS FOR PREPARING ORGANIC DIISOCYANATES

Melvin D. Hurwitz, Huntingdon Valley, and Robert W. Auten, Jenkintown, Pa., assignors to Rohm & Haas Company, Philadelphia, Pa., a corporation of Delaware No Drawing. Application March 3, 1953,
Serial No. 340,144

6 Claims. (Cl. 260—453)

This invention relates to a novel process for preparing organic diisocyanates. It relates particularly to the preparation of 1,8-diisocyanato-p-menthane which has the formula

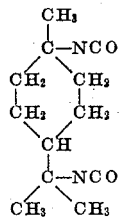

This application is a continuation-in-part of our earlier application, Serial No. 171,557, filed June 30, 1950, now United States Patent No. 2,640,846.

The process of this invention comprises dehydrohalogenating an organic compound which contains two N-halo-formamido groups and which has the general formula

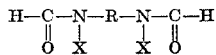

in which X, in both occurrences, represents an atom of chlorine or bromine and R represents a divalent, aliphatic, organic radical containing at least four carbon atoms, preferably a hydrocarbon radical. The reaction which takes place by the preferred process is shown by the following equation:

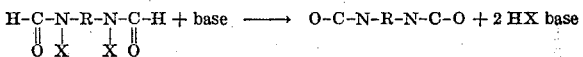

It is to be noted that the compound containing the two N-halo-formamido groups is dehydrohalogenated and that the reaction proceeds to completion as the liberated halogen acid is bound by the base or is otherwise removed. It is also to be noted that the radicals which are represented above by R remain intact and are not affected by the conditions of operation. Since the groups represented by R are unaffected, this novel process gives rise to excellent yields of a wide variety of diisocyanates which differ from each other only as regards the inert R-groups. The same procedure, which is described in detail in the example below, is followed regardless of the nature of the hydrocarbon group R in the di-(N-halo-formamide) provided the group is aliphatic and contains four or more carbon atoms.

The di-(N-halo-formamides) from which the diisocyanates are made according to this invention, are themselves new compounds and are most conveniently prepared by treating a compound containing two formamido groups, HCONH—, and having the general formula, HCONH—R—NHOCH, with a hypohalite, preferably with a tertiary-alkyl hypohalite. The intermediate diformamido compounds are themselves best prepared by the comparatively new process of reacting a diolefin with hydrogen cyanide, water, and sulfuric acid.

The process of this invention is carried out commercially with ease and high efficiency and with practically no corrosion of equipment. In these respects it has definite advantages over such well known methods as those involving the reaction of amines with phosgene or the Hofmann degradation, or rearrangement, of amides to amines.

The groups represented by R in the above formulas are those which are inert in the accepted sense that they do not in themselves undergo extraneous reaction under the conditions for converting the di-(N-halo-formamides) to the diisocyanates and do not, therefore, give rise to by-products. It is preferred that the compounds containing the two N-halo-formamido groups be those in which the R groups contain four or more carbon atoms and are divalent, saturated, aliphatic or alicyclic hydrocarbon groups. Thus, examples of di-(N-haloformamides) which are readily converted by the process of this invention to the corresponding diisocyanates include the following:

1,8-di-(N-chloro-formamido)-p-menthane;
1,4-di-(N-chloro-formamido)-hexane;
1,6-di-(N-bromo-formamido)-butane;
1,10-di-(N-chloro-formamido)-decane; and
1,4-di-(N-chloro-formamido)-cyclohexane.

The di-(N-halo-formamides) are best converted to the diisocyanates under anhydrous conditions in the presence of a dehydrohalogenating agent which promotes dehydrohalogenation catalytically or preferably which reacts and bonds the hydrohalogen as the latter is liberated. Particularly suitable for this purpose are compounds such as pyridine, quinoline, and tertiary amines. Ideal tertiary amines are those of the formula $R_1R_2R_3N$ in which $R_1$, $R_2$, and $R_3$ are monovalent hydrocarbon groups such as alkyl, aryl, cycloalkyl and aralkyl groups. Typical satisfactory tertiary amines include triethylamine, benzyldimethylamine, and dimethylaniline. Primary and secondary amines cannot be recommended because they give rise to the formation of by-products due to the reactivity of their amino-hydrogen atoms. Dehydrohalogenating catalysts such as aluminum chloride and ferric chloride have been used successfully. Solid sodium hydroxide or potassium hydroxide can be used particularly in the presence of an inert solvent. As a matter of fact, aqueous sodium hydroxide has been used with some degree of success although it is preferred to conduct the reaction under anhydrous conditions. What is essential is that the di-(N-halo-formamides) be dehydrohalogenated and for this purpose conventional agents, catalysts, conditions, and techniques which cause or encourage dehydrohalogenation can be used to advantage. In fact, heating of the di-(N-haloformamides) alone under reduced pressure brings about their dehydrohalogenation to some extent. The use, however, of a dehydrohalogenating agent—particularly an organic agent—gives much more satisfactory results and better yields of the diisocyanates; and the use therefore of such a material is recommended in amounts equivalent to or in slight excess over the amount of di-(N-halo-formamido) compound which is to be converted to the diisocyanate. Actually, a large excess of a suitable organic base or tertiary amine is not objectionable since it serves as a solvent for the reaction mixture.

The compounds containing the two N-halo-formamido groups are converted to the diisocyanates preferably under the influence of heat although some dehydrohalogenation takes place slowly in the presence of a dehydrohalogenating agent at temperatures as low as 0° C. Actually, it is preferred to conduct the reaction at a temperature from room temperature (about 20° C.) to about 100° C. While higher temperatures accelerate the rate of dehydrohalogenation, they also cause some decomposition of the di-(N-halo-formamido) compounds and the diisocyanates with the formation of undesirable by-products. Consequently, a maximum temperature of 200° C. or a temperature just below the decomposition point of the particular diisocyanate in preparation should not be exceeded.

Very satisfactory results have been obtained under normal atmospheric pressure but either reduced or super-atmospheric pressures can be employed. Currently, however, there does not appear to be any marked advantage in altering the pressure, particularly when an efficient acid-acceptor or dehydrohalogenating agent such as pyridine is present.

Likewise, if desired, the reaction can be carried out in the presence of inert solvents, such as carbon tetrachloride, benzene, toluene, petroleum ether, mineral spirits, and the like.

The following example illustrates the process of this invention. It describes the preferred conditions and procedural steps which are employed in the conversion of di-(N-halo-formamides) described above to the corresponding diisocyanates.

Example

Into a three-necked flask equipped with a thermometer, a mechanical stirrer and a reflux condenser, was charged 317 grams of 1,8-diformamido-p-menthane having the formula

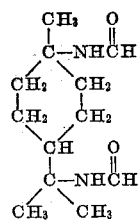

Then there was added 360 grams of tert.-butyl hypochlorite and the mixture was stirred at room temperature while the diformamide dissolved slowly. An exothermic reaction began which ultimately carried the temperature of the reaction mixture to 40° C. The temperature was held at 40° C. for 8 hours during which time a crystalline product separated. The product was filtered and dried under reduced pressure. A 78% yield was obtained of a compound which was identified as 1,8-di-(N-chloro-formamido)-p-menthane having the formula

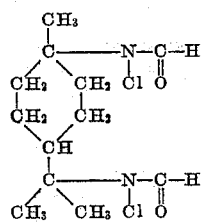

(*Analysis.*—Found 9.2% N and 23.3% Cl; calculated 9.5% N and 24.0% Cl.)

Into a three-necked flash equipped with stirrer, thermometer and reflux condenser was charged a mixture of 164 grams of pyridine, 200 grams of carbon tetrachloride and 150 grams of 1,8-di-(N-chloro-formamido)-p-menthane (formed above). The reaction mixture was heated to refluxing temperature (92° C.) and was then refluxed for 2.5 hours. The product was isolated from the filtered reaction mixture by distillation. A 49% yield was thus obtained of 1,8-diisocyanato-p-menthane

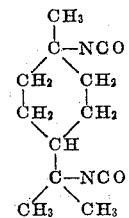

which boiled at 90°–100° C./0.3 mm. and had an index of refraction of $N_D^{25}$ 1.4713. Its composition was confirmed by analysis.

As is known, diisocyanates such as prepared by the process of this invention are valuble chemicals which are very reactive with primary and secondary amines, carboxylic acids and alcohols. They are useful as components of adhesives wherein they promote adhesion and as modifiers for plastics, such as in elastomers and in expanded materials.

We claim:

1. A process for preparing organic diisocyanates having the formula OCN—R—NCO in which R is a divalent, saturated, hydrocarbon radical from the group consisting of aliphatic and alicyclic radicals containing at least four carbon atoms, which process comprises dehydrohalogenating, in the presence of a tertiary amine, a compound having the general formula

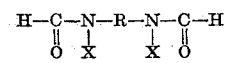

in which X, in both occurrences, is an atom of a halogen from the class consisting of chlorine and bromine and R has the significance described above.

2. A process for preparing organic diisocyanates having the formula OCN—R—NCO which comprises dehydrochlorinating, in the presence of a tertiary amine, a compound having the general formula

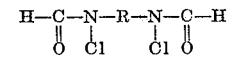

the character R representing in both formulas the same divalent, saturated, hydrocarbon radical from the group consisting of aliphatic and alicyclic radicals containing at least four carbon atoms.

3. A process for preparing 1,8-diisocyanato-p-menthane having the formula

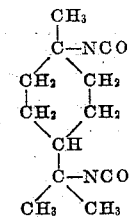

which comprises dehydrohalogenating, in the presence of a tertiary amine, 1,8-di-(N-chloro-formamido)-p-menthane of the formula

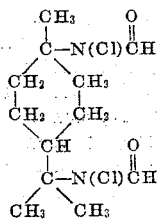

4. As a new composition of matter, 1,8-diisocyanato-p-menthane of the formula

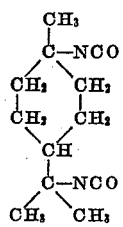

5. A process for preparing organic diisocyanates having the formula OCN—R—NCO in which R is a divalent, saturated, hydrocarbon radical from the group consisting of aliphatic and alicyclic radicals containing at least four carbon atoms, which process comprises dehydrohalogenating, in the presence of a dehydrohalogenating agent which is free of primary and secondary amino groups, a compound having the general formula

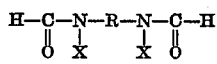

in which X, in both occurrences, is an atom of a halogen from the class consisting of chlorine and bromine and R has the significance described above.

6. A process for preparing 1,8-diisocyanato-p-menthane having the formula

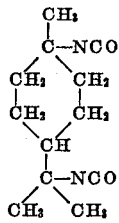

which comprises dehydrohalogenating, in the presence of a dehydrohalogenating agent which is free of primary and secondary amino groups, 1,8-di-(N-chloro-formamido)-p-menthane of the formula

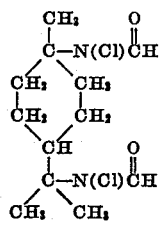

References Cited in the file of this patent
UNITED STATES PATENTS
2,640,846    Hurwitz et al. _____ June 2, 1953